(12) United States Patent
Baer et al.

(10) Patent No.: US 6,357,512 B1
(45) Date of Patent: Mar. 19, 2002

(54) PASSIVE HEATING AND COOLING SYSTEM

(75) Inventors: Stephen C. Baer, Corales; William Mingenbach, Taos, both of NM (US)

(73) Assignee: Zomeworks, NW. Sparks, NM (US)

( * ) Notice: Subject to any disclaimer, the term of this patent is extended or adjusted under 35 U.S.C. 154(b) by 0 days.

(21) Appl. No.: 09/625,438

(22) Filed: Jul. 26, 2000

(51) Int. Cl.[7] .......................... F25B 29/00; F04D 13/18; F24J 2/44
(52) U.S. Cl. ........................ 165/48.2; 126/639; 126/621
(58) Field of Search ............................... 165/48.1, 48.2, 165/128; 126/639, 638, 621, 623, 702, 655

(56) References Cited

U.S. PATENT DOCUMENTS

| | | |
|---|---|---|
| 627,010 A | 6/1899 | Perdue |
| 960,921 A | 6/1910 | Hill |
| 1,112,861 A | 10/1914 | Snyder |
| 1,236,673 A | 8/1917 | Chamberlain |
| 1,242,511 A * | 10/1917 | Bailey .................. 126/639 |
| 1,313,512 A | 8/1919 | Bedell et al. |
| 2,187,954 A | 1/1940 | Smith ......................... 261/11 |
| 2,231,101 A | 2/1941 | Winship ........................ 62/17 |
| 2,364,144 A | 12/1944 | Hunsaker ...................... 98/32 |
| 2,527,782 A | 12/1950 | Williams ...................... 62/6 |
| 2,636,371 A | 4/1953 | Stephens .................... 62/168 |
| 3,271,710 A | 9/1966 | Leonard ..................... 336/55 |
| 3,514,508 A | 5/1970 | Schott et al. ................ 264/85 |
| 3,903,958 A | 9/1975 | Hay ............................ 165/2 |
| 3,926,598 A | 12/1975 | Filén ........................... 55/385 |
| 3,985,182 A | 10/1976 | Hara et al. .................. 165/32 |
| 3,995,080 A | 11/1976 | Cogburn et al. ............. 428/35 |
| 4,000,850 A * | 1/1977 | Diggs ........................ 126/613 |
| 4,023,257 A | 5/1977 | Wright et al. ................ 29/460 |
| 4,062,351 A | 12/1977 | Hastwell ..................... 126/271 |
| 4,082,080 A | 4/1978 | Pittinger ..................... 126/271 |
| 4,089,916 A | 5/1978 | Hay ........................... 261/153 |

(List continued on next page.)

FOREIGN PATENT DOCUMENTS

| | | |
|---|---|---|
| FR | 429332 | 9/1911 |
| GB | 800329 | 8/1958 |

*Primary Examiner*—Ira S. Lazarus
*Assistant Examiner*—Tho V Duong
(74) *Attorney, Agent, or Firm*—Townsend and Townsend and Crew LLP

(57) ABSTRACT

An apparatus and method are disclosed by which the temperature of an enclosure can be prevented from reaching extremely high or extremely low points. The enclosure provides a functional area whose temperature is adjusted by heated or cooled water contained within a water container which is located above the functional area and below the ceiling of the enclosure. The water in the water container is heated or cooled, depending on the desired effect, by exposing the water to atmospheric conditions while passing through a radiator/absorber located on the roof of the enclosure. The radiator/absorber has an inclined configuration, with higher and lower ends. The water passes from the water container to the radiator/absorber and back again to the water container through a pair of conduits. A warm water conduit runs between one end of the water container and the higher end of the radiator/absorber, while a cold water conduit runs between the other end of the water container and the lower end of the radiator/absorber. The water will passively travel from the water container to the radiator/absorber during warm weather by creating a thermal siphon at night. A pump is attached to the cold water conduit and used to circulate water in cold weather when heating is desired.

44 Claims, 5 Drawing Sheets

U.S. PATENT DOCUMENTS

| | | | | |
|---|---|---|---|---|
| 4,111,004 A | | 9/1978 | Blomberg | 62/476 |
| 4,120,285 A | * | 10/1978 | Nugent | 126/653 |
| 4,143,193 A | | 3/1979 | Rees | 428/35 |
| 4,148,293 A | * | 4/1979 | Lents et al. | 126/653 |
| 4,214,670 A | | 7/1980 | Berger et al. | 220/70 |
| 4,237,965 A | | 12/1980 | Hay | 165/2 |
| 4,267,825 A | | 5/1981 | Ward | 126/433 |
| 4,290,416 A | | 9/1981 | Maloney | 126/430 |
| 4,324,229 A | * | 4/1982 | Risser | 126/603 |
| 4,331,128 A | | 5/1982 | Gebhardt | 126/417 |
| 4,350,200 A | | 9/1982 | McElwain | 165/48 |
| 4,351,320 A | * | 9/1982 | Tetirick | 126/607 |
| 4,356,811 A | | 11/1982 | de Grijs et al. | 126/433 |
| 4,357,293 A | | 11/1982 | Williamson, Jr. | 264/275 |
| 4,444,249 A | * | 4/1984 | Cady | 165/48.2 |
| 4,465,963 A | | 8/1984 | Iseard | 320/46 |
| 4,524,609 A | | 6/1985 | Sharp | 73/49 |
| 4,545,910 A | | 10/1985 | Marze | 210/651 |
| 4,627,487 A | | 12/1986 | Basiulis | 165/104.26 |
| 4,703,889 A | * | 11/1987 | Simpson | 237/70 |
| 4,738,247 A | | 4/1988 | Moore | 126/433 |
| 4,744,906 A | | 5/1988 | Gerlach et al. | 210/651 |
| 4,750,473 A | | 6/1988 | Dunn | 126/417 |
| 4,847,028 A | | 7/1989 | Snyder et al. | 264/155 |
| 4,913,985 A | | 4/1990 | Baer | 429/50 |
| 4,941,526 A | | 7/1990 | Nilsson | 165/32 |
| 4,957,522 A | | 9/1990 | Brassell | 55/316 |
| 4,980,112 A | | 12/1990 | Masters | 264/225 |
| 5,070,933 A | | 12/1991 | Baer | 165/32 |
| 5,094,607 A | | 3/1992 | Masters | 425/429 |
| 5,097,750 A | | 3/1992 | Oldham et al. | 454/63 |
| 5,195,575 A | | 3/1993 | Wylie | 165/132 |
| 5,259,363 A | * | 11/1993 | Peacock et al. | 126/621 |
| 5,273,657 A | | 12/1993 | Nakashima et al. | 210/640 |
| 5,341,083 A | | 8/1994 | Klontz et al. | 320/2 |

* cited by examiner

PASSIVE HEATING AND COOLING SYSTEM

BACKGROUND OF THE INVENTION

The present invention relates generally to a system and method by which an enclosure can be heated and passively cooled by absorbing heat from the sun and releasing excess heat into the atmosphere.

Most enclosures such as homes, offices, and shops intended for human habitation require heating and cooling methods which are rather exact and always adjustable. However, there are several types of enclosures which require a less exact method of heating and cooling, and even enclosures intended for human habitation do not always require exact temperature control. Some examples of enclosures which need to be protected from extreme temperature changes, but not maintained at a constant humanly habitable temperature at all times are livestock and poultry shelters, and remote electrical installations. Despite the ease with which a home or business can, in most cases, be heated for a reasonable amount of money, there are few financially feasible methods by which a remote enclosure can be heated and cooled by equivalent apparatus when there is no available electricity.

In the past, various passive temperature regulation systems have been used in these remote locations to prevent overheating in the warmest parts of the year. In U.S. Pat. No. 4,913,985 such a system is disclosed. This system allows warm water to radiate heat outward into the night sky through a radiator located at an incline on the roof of the enclosure. After the water is cooled in the radiator, it is removed from the bottom of the radiator and circulates through the skin of the enclosure via a pair of conduits. The cooled water is ultimately deposited in the bottom of a water container. Warm water is removed from the top of the water container and transported to the top of the radiator. As warm water enters the higher end of the radiator, the cooling cycle begins again. This system relies on the radiator and conduits to form a thermal siphon at night in order to circulate the warm and cool water between the radiator and the water container.

Although this system ideally reduces the temperature inside of an enclosure, the thermal siphon does not always work in the direction in which it is intended to flow. Subtle atmospheric conditions can cause the cool water from the bottom of the tank to be drawn into the radiator and cold water is returned to the top of the tank. This form of back flow causes the warm water in the radiator and the cold water in the radiator to stagnate, and thus not deliver the cooling effect which is desired.

In U.S. Pat. No. 5,316,872 a system is disclosed by which an enclosed area can be cooled using a quantity of water by a passive apparatus despite the direction in which the thermal siphon is created. By symmetrically aligning the conduits through which the water travels through the skin of the enclosure, the apparatus eliminates any need for a specified thermal siphon direction.

Previously there have been no known passive cooling systems using water which could generate heating and cooling effects in winter and summer respectively using the same plumbing. It was understood that water could be cooled at night by allowing it to radiate heat into the atmosphere. Creating a thermal siphon is a natural and passive way to accomplish this cooling in locations where electricity is not available. It was also understood that exposing water to sunlight causes the water to heat. However, in the past, no known apparatus or method was developed by which this passive cooling of water could be simply combined with pumped heating using the same plumbing.

SUMMARY OF THE INVENTION

The present invention provides an apparatus and method by which the temperature of an enclosure can be prevented from reaching extremely high or extremely low points. The enclosure provides a functional area whose temperature is adjusted by heated or cooled water contained within a water container which is located above the functional area and below the ceiling of the enclosure. The water in the water container is heated or cooled, depending on the desired effect, by exposing the water to atmospheric conditions while passing through a radiator/absorber located on the roof of the enclosure. The radiator/absorber has an inclined configuration, with higher and lower ends. The water passes from the water container to the radiator/absorber and back again to the water container through a pair of conduits. A warm water conduit runs between one end of the water container and the higher end of the radiator/absorber, while a cold water conduit runs between the other end of the water container and the lower end of the radiator/absorber. The water will passively travel from the water container to the radiator/absorber during warm weather by creating a thermal siphon at night. A pump is attached to the cold water conduit and used to circulate water in cold weather when heating is desired.

When cooling is desired, and water is circulated between the radiator/absorber and the water container by a naturally creating a thermal siphon, the entire apparatus, including the radiator/absorber, water container, and conduits, must be filled with water. When heating is desired and the pump is required to circulate water throughout the apparatus, the water level is lowered so that when all the water is settled, it just barely fills the water container. Lowering the water level prevents the formation of an accidental thermal siphoning effect at a time when heating and not cooling is desired. As water passes through the radiator/absorber, it either absorbs heat from the sun or radiates heat into the atmosphere. When heating is desired, the water is passed through the radiator/absorber during the day in order to absorb the available solar energy. Cooling is accomplished by allowing the water to thermal siphon through the radiator/absorber at night and radiate the heat absorbed during the day into the atmosphere.

In the preferred embodiments of the present invention, the water container which holds the water above the functional area of the enclosure is composed of a plurality of water tubes. Because the radiant heat and radiant cool must pass through the outer surface of the water container before affecting the ambient temperature in the enclosure, the larger the surface area of the water, the more radiant heat and radiant cool can be exchanged with the functional space of the enclosure. Additionally, the cost of ordinary tubes which are thermally conductive is minimal when compared to the cost of manufacturing a tank to accommodate the various ceiling sizes of different enclosures. In the preferred embodiments, thin wall PVC pipe having an 8 inch diameter, and 0.100 inch thickness work well and cost on the order of $1 per square foot.

In one preferred embodiment of the present invention, the radiator/absorber is a hollow propylene sheet having multiple flow paths from its higher end to its lower end as mounted. Basically, the radiator/absorber in this embodiment of the present invention is very similar to a standard solar collector often used to heat swimming pools, albeit one without flow path inhibitors. In a second embodiment of the present invention, the radiator/absorber preferably has panels which can be rotated from one side to the other. One side of the radiator/absorber panels are preferably covered in flat white paint to discourage the absorption of heat and maximizing heat dissipation when cooling is desired. The other side of the radiator/absorber panels are preferably covered in selective black paint so that solar energy absorption is promoted when heating is desired.

Although the amount of solar energy incident upon the radiator/absorber is less predictable than the regularity with which the darkness of nighttime will appear due to unpredictable weather conditions, heat can be stored in larger quantities than the cooling effect of heat dissipation. As a result of this excess stored heat, the water tubes can cause the temperature in the enclosure to rise above a desirable temperature. In order to prevent the overheating of the functional area of the enclosure, a plurality of adjustable shutters are installed between the water tubes and the functional area of the enclosure in the preferred embodiment. With the shutters completely closed, the radiant heat flux from the water tubes can be reduced from 0.7 BTU/degree Fahrenheit hr. per sq. ft to 0.2 BTU/degree Fahrenheit hr. per sq. ft.

The unitary system and method of the present invention provide both passive cooling and passive heating to an enclosure. All that is required to change the system from heating to cooling is a change in the quantity of the water, and implementation of the pump. During summer, the system and method provide a thermal mass to absorb heat during the day, and dissipate heat during the night, to moderate the temperature within the disclosure. During winter, the pump (which can be solar powered) is actuated to solar heat the water and provide heat to the interior of the enclosure. Shutters can be used to control heat transfer. The system and method thus provide a system for passively heating and cooling the enclosure, and moderating the temperature to provide effective shelter for livestock, and protection from extreme heat for electrical devices. Also, the system and method can be operated in a controlled fashion to provide thermal control for human habitation, particularly if supplemented by more active systems.

The novel features which are characteristic of the invention, as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

DESCRIPTION OF THE SPECIFIC EMBODIMENTS

Figure 1:
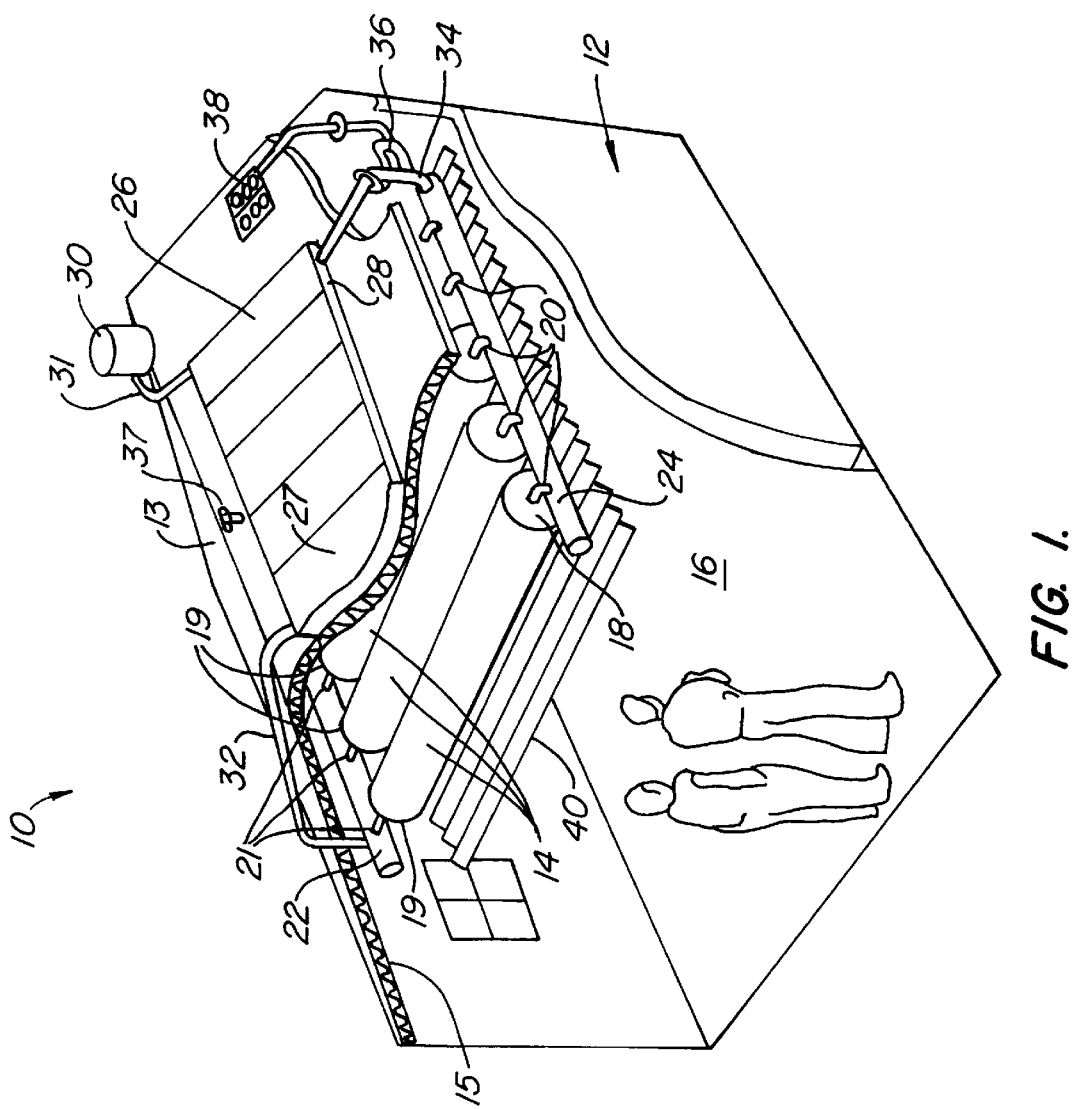
FIG. 1 is a cutaway perspective view of an enclosure including the preferred embodiments of the present invention.

The preferred embodiments of the present invention include an apparatus 10 mounted on the upper portion of an enclosure 12 having an exterior roof 13, an interior ceiling 15, and an enclosed functional area 16. The functional area 16 could be intended to house humans livestock, electrical equipment, or any of a wide variety of other applications, and could be to human scale, or much larger or smaller. A water container in the form of a plurality of water tubes 14 is located below ceiling 15 of enclosure 12, and above the functional area 16 of the enclosure. The water tubes contain water which absorb heat from the functional area 16 of enclosure 12 when the ambient temperature in the functional area is greater than that of the water. The water could contain additives or be chemically altered (e.g., antifreeze or refrigerant) to minimize overheating to prevent freezing. Water tubes 16 and the thermal mass of the water they contain can provide a cooling effect (through heat absorption) when the functional area is warm. Conversely, when the temperature of the water is greater than that of functional area 16, they will radiate heat into the functional area to provide a heating effect.

The water tubes 14 can be made of ordinary PVC conduit because of its low cost and availability in various sizes and lengths. Thin walled PVC pipe of the type used for irrigation having an 8 inch diameter and 0.100 inch thickness is preferred, and is mounted 12 inches on center. Each water tube 14 has two opposite lateral ends designated as the cold water ends 18 and the warm water ends 19 respectively. To maximize the number of water tubes 14 which can fit in one enclosure 12, the water tubes 14 are aligned parallel to each other. In the preferred embodiment of the present invention, the water tubes 14 are parallel to two walls of the enclosure, and perpendicular to the other two walls of the enclosure. The water tubes 14 each extend the length of the enclosure so that the lateral ends 18,19 face walls of the enclosure on both ends of the parallel water tubes.

The lateral ends 18,19 of the water tubes 14 are almost completely sealed, except for small tubes 20,21 which extend out of each respective lateral end of each water tube. The small tubes 20,21 are made of silicone rubber and have compression fittings at each end to provide a simple yet effective and leak-free low pressure connection. Although all the small tubes 20 on one lateral end 18 or 19 of the water tubes 24 are all positioned at the same height, the height of the small tubes on different lateral ends of the water tubes 14 is not the same. On the warm water ends 19 of the water tubes 14 the small tubes 21 are located near the top of the lateral ends of the water tubes. On the opposite cold water ends 18 of the water tubes 14, the small tubes 20 are located near the bottom of the lateral ends of the water tubes.

Two container headers run perpendicular to the parallel orientation of the water tubes 14. A warm water container header 22 is located at the warm water lateral ends 19 of the water tubes 14, where the small tubes 21 intersect the lateral ends near the top. A cold water container header 24 is located on the cold water lateral ends 18 of water tubes 14. Headers 22 and 24 are also made of ordinary PVC conduit so that length and size can be easily selected and adjusted to accommodate any size enclosure 12. The small tubes 20,21 run between the water tubes 14 and the container headers, thus providing a path through which water can run from the water tubes 14 to the container headers and vice versa. Small rubber tubes 20,21 have a compression fitting with headers 24,25 to provide a simple yet reliable and leak-free interconnection. Container headers 22,24 equalize the temperature of the water in all of the plurality of water tubes 14, thus providing consistent heating and cooling throughout the functional area 16 of enclosure 12.

A radiator/absorber 26 is located on the roof 13 of enclosure 12. Radiator/absorber 26 is supported in an inclined configuration at an angle which varies with latitude but which is approximately 45° in southern latitudes in the United States. In order to be most productive, the upper surface of radiator/absorber 26 should be exposed to the atmosphere and have no structures above it. In one embodiment of the present invention, radiator/absorber 26 is composed of a plurality of flat, hollow panels 27 which are rotatable so that either side can be directed upwardly. Because of the slight incline of radiator/absorber 26, each of the radiator/absorber's panels has an upper and lower end.

A second embodiment of the radiator/absorber 26 is also illustrated in FIG. 1. In the second embodiment, radiator/absorber 26 consists of a hollow polypropylene sheet having multiple flow paths from the higher end to the lower end. It has been determined that standard swimming pool solar collector material of the type without internal baffles or other flow restrictors works well with the context of the present invention. One such material can be purchased from a company called Heliocol, located in Israel. It is anticipated that such material will also become available from manufacturers of swimming pool collectors in the United States, although most such currently available material has undesirable internal flow restrictors or baffles and is not free flowing. It is anticipated that when such material without internal baffles or flow restrictors is generally available, the cost will be approximately $1 per square foot.

A pair of radiator/absorber headers are located at the respective upper and lower ends of the panels 27 of radiator/absorber 26. A cold water radiator/absorber header 28 is located at the lower end of panels 27 of radiator/absorber 26, and a warm water radiator/absorber header 29 (See FIG. 4) is located at the higher end of the radiator/absorber. The radiator/absorber headers 28,29 are connected to the upper and lower ends of the panels 27 of radiator/absorber 26. The radiator/absorber headers 28,29 in the preferred embodiment of the present invention allow for the rotation of the panels 27 of radiator/absorber 26 about a longitudinal axis. The radiator/absorber headers, like the container headers 22,24 located above the functional area of the enclosure 16, are made of ordinary conduit in order to inexpensively accommodate various sized enclosures 12.

The warm water radiator/absorber header 29 is connected by a conduit 31 to an expansion tank 30 located above the highest end of the radiator/absorber 26. Expansion tank 30 is the highest water-containing part of the apparatus 10. When the water level in the system is raised to that of expansion tank 30, as required for operation in the summer, the expansion tank ensures that the remainder of the system is completely filled with water.

Two conduits pass through the skin of the enclosure 12 in order to connect the two pairs of headers. A warm water conduit 32 interconnects the warm water container header 22 and the warm water radiator/absorber header 29. Warm water conduit 32 provides a flow path between the upper end of the panels 27 of radiator/absorber 26 and the warm water lateral ends 19 of water tubes 14. A cold water conduit 34 interconnects the cold water container header 24 and the cold water radiator/absorber header 28. Cold water conduit 34 thus provides a flow path for the water between the lower ends of the panels 27 of radiator/absorber 26 and the cold water lateral ends 18 of water tubes 14.

Although cold water conduit 34 primarily functions as a route by which water can travel between the lower ends of the panels 27 of radiator/absorber 26 and cold water container header 24, it also plays other roles in the functioning of apparatus 10. A pump 36 is in operable contact with the cold water conduit 34 between the cold water container header 24 and the cold water radiator/absorber header 28. The present invention utilizes passive circulation of water when cooling is desired, and the actuation of pump 36 when heating is required. Because the flow of water through the apparatus 10 does not always need assistance, pump 36 is in operable contact with cold water conduit 34, but is not always actuated.

A sprinkler head 37 can be located on the roof 13 of enclosure 12. Sprinkler 37 can be used to sprinkle water on the tops of radiator/absorber 26 when cooling is desired during summer nights. A small amount of water on radiator/absorber 26 greatly facilitates the transfer of heat from the water inside the radiator/absorber to the atmosphere.

A photovoltaic panel 38 is connected to pump 36 in cold water conduit 34. Photovoltaic panel 38 is mounted on the roof of enclosure 12 and has a flat surface which is tilted to maximize its exposure to solar energy. Photovoltaic panel 38 senses when solar energy is available. When heating is desired, and solar energy is available, pump 36 is actuated and forces water upwardly through cold water conduit 34 and through panels 27 in radiator/absorber 26. The water will thus be heated by solar energy as it passes through panels 27 in radiator/absorber 26. The heated water returns to water tubes 14 through warm water conduit 32 to provide heat to the functional area 16 of enclosure 12.

Figure 2:
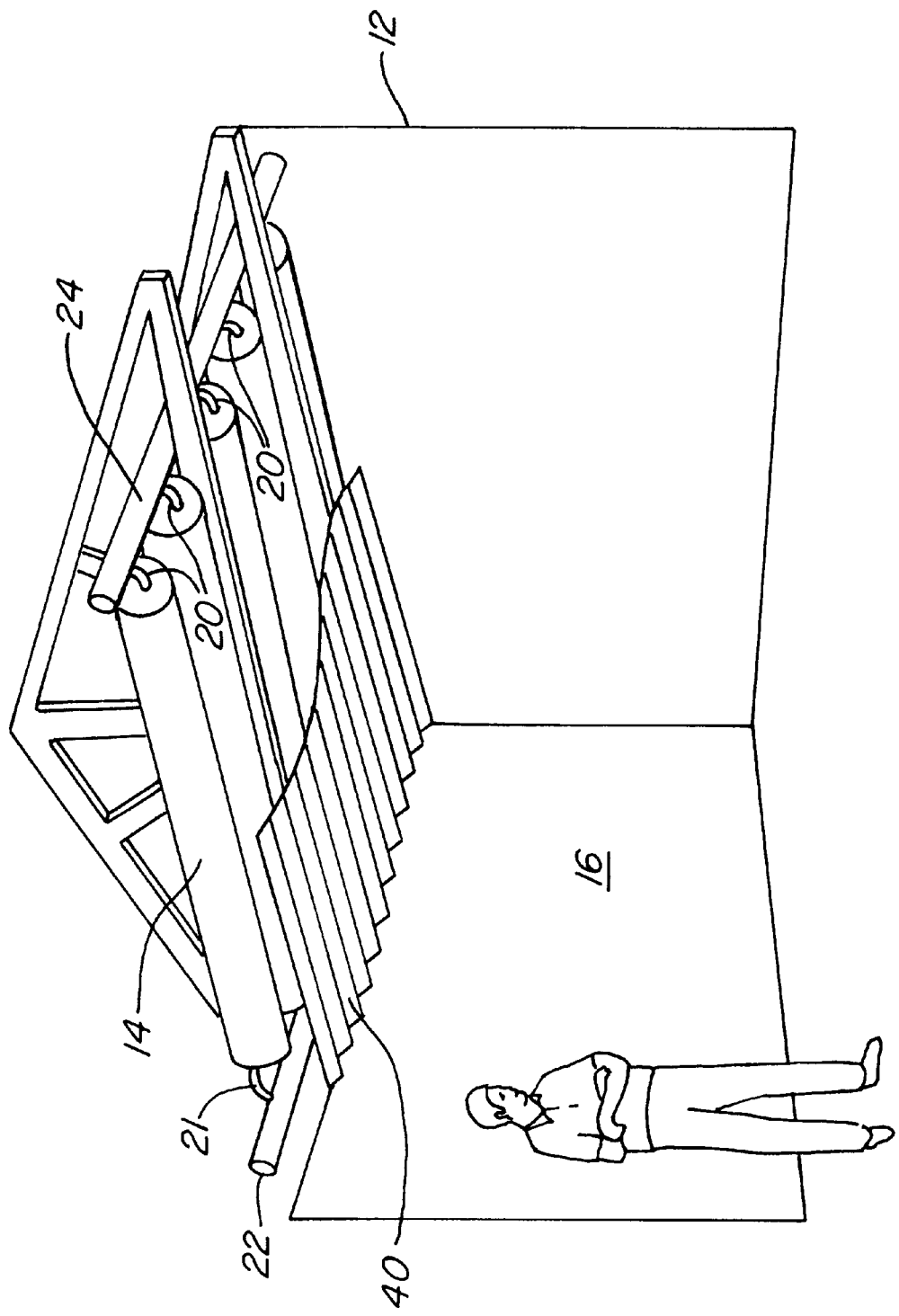
FIG. 2 is a different cutaway perspective view of an enclosure including the preferred embodiments of the present invention.

As illustrated in FIG. 2, a plurality of operable shutters 40 are located within enclosure 12 below the plurality of water tubes 14, and above the functional area 16 of enclosure 12. The positioning of shutters 40 relative to water tubes 14 is adjustable. The range of motion of shutters 40 is from completely closed, wherein all shutters 40 are parallel to ceiling 15 of enclosure 12, to completely open, wherein all shutters 40 are perpendicular to the ceiling 15 of enclosure 12. Although storing extra cool is difficult, extra heat can be accumulated easily by the water in water tubes 14. Operable shutters 40 are used to block the transfer of excess heat from the water tubes 14 to the functional area 16 of enclosure 12 when an excess of heat has been stored. In the preferred embodiments of the present invention, shutters 40 are constructed of unpainted aluminum to reflect heat upwardly but not emit heat downwardly.

Figure 3:
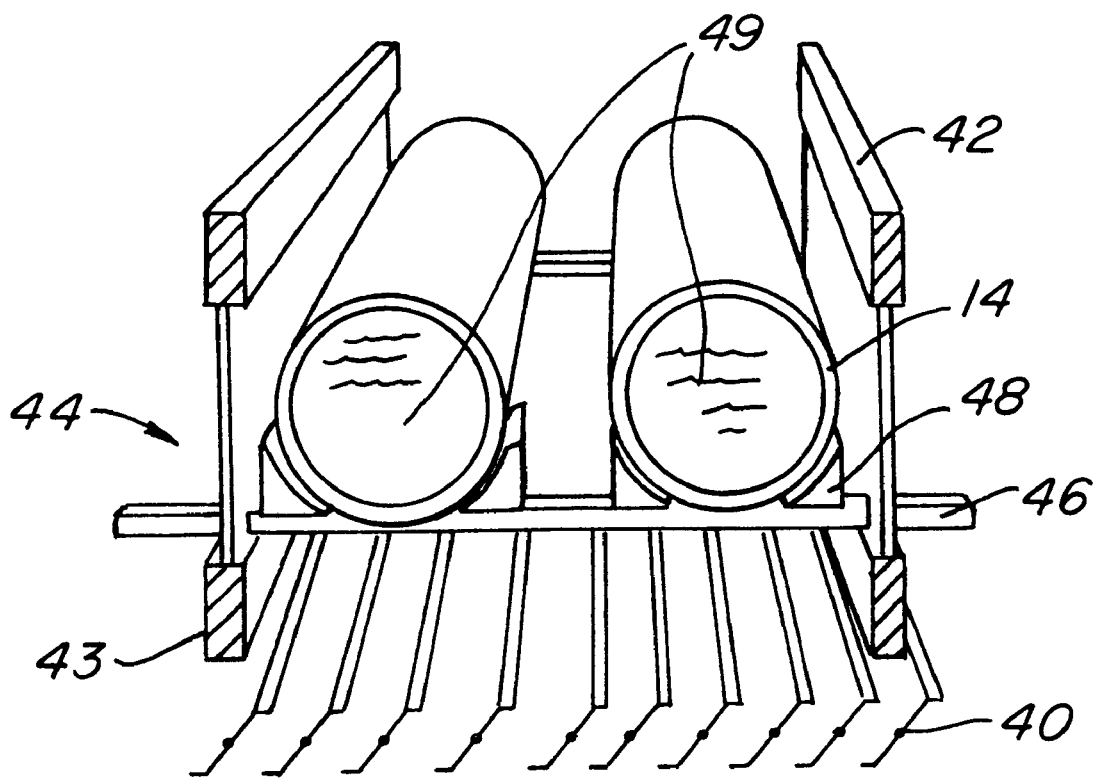
FIG. 3 is a fragmentary perspective view of a portion of the preferred embodiments of the tube construction of the present invention.

FIG. 3 illustrates the preferred embodiment of the support structure for the water tubes 14 of apparatus 10 in the ceiling area of enclosure 12. The vertical elements 42 of enclosure 12 extend along the sides of a pair of water tubes 14. A water tube support structure 44 is installed in enclosure 12 which includes lateral beams 43 at the desired height of the bottom surfaces of water tubes 14. Support structure 44 also includes horizontal thin beams 46 supporting a plurality of saddle supports 48. Each thin beam 46 runs the length of enclosure 12 perpendicular to the direction in which water tubes 14 will be installed. Thin beams 46 are installed near the opposite ends of the water tubes 14 to provide the maximum support for the water tubes. One beam 46 is proximate the cold water container header 24 and the second beam 46 is proximate the warm water container header 22. Operable shutters 40 are located immediately beneath thin beams 46. This water tube support structure 44 provides a reliable apparatus for securing the water tubes 14, while minimizing the amount of water tube surface area concealed from the functional area 16 of enclosure 12.

Figure 4:
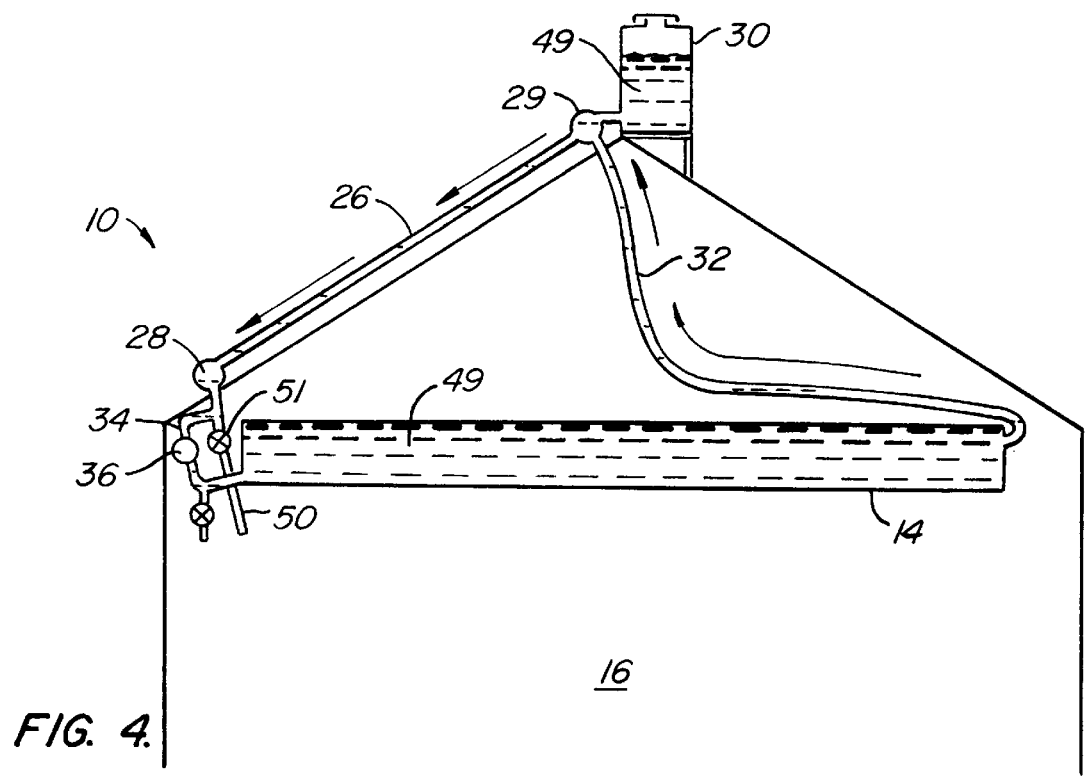
FIG. 4 is a sectional schematic view illustrating the summer operation of the preferred embodiments of the present invention.
Figure 5:
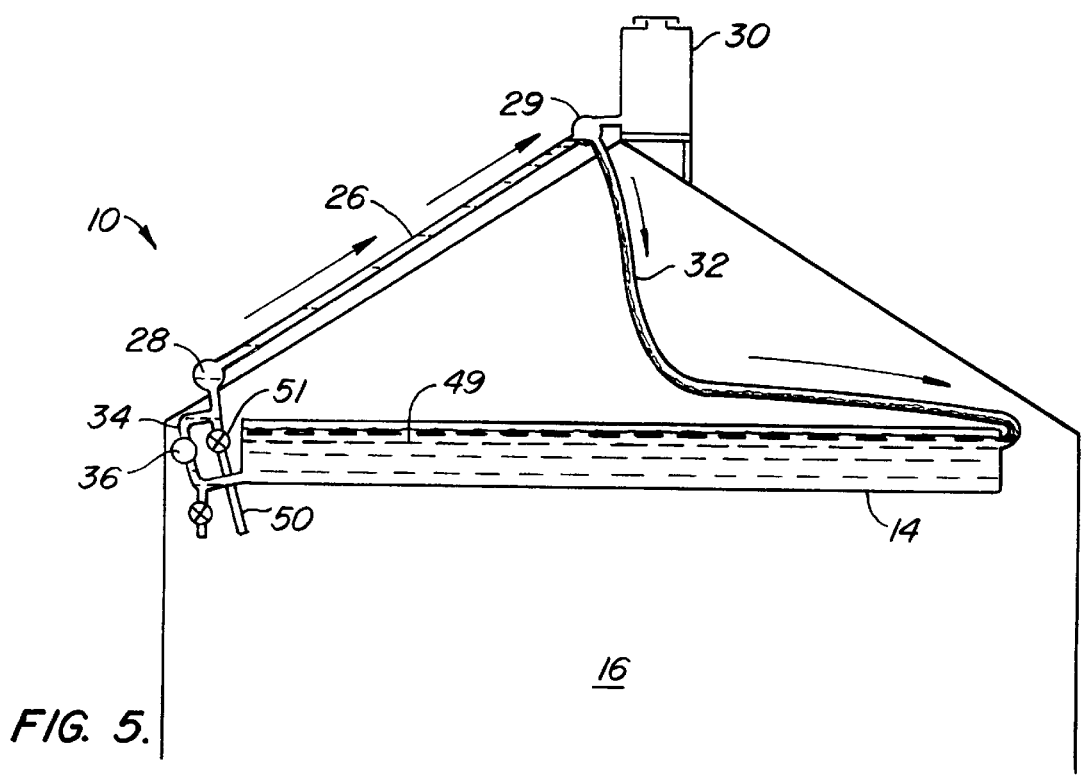
FIG. 5 is a sectional schematic view illustrating the winter operation of the preferred embodiments of the present invention.

The seasonal changes required by the preferred embodiment of the present invention are illustrated in FIGS. 4 and 5. The amount of water 49 contained within the apparatus 10 is different when heating and cooling are desired. When cooling is desired, more water 49 is required than when heating is desired. In the summer, when cooling is most often desired, the water tubes 14, radiator/absorber 26, warm water conduit 32, cold water conduit 34, and expansion tank 30 are all filled with water 49, as illustrated in FIG. 4. By filling all sections of the apparatus 10 with water, a thermal siphon is created at night, when the water 49 in the radiator/absorber 26 is cooled by radiation into the atmosphere. The thermal siphon is a passive means by which water 49 can travel through all parts of the apparatus 10.

On summer nights when cooling is desired, the warmest water 49 in the water tubes 14 rises to the top. This warm water 49 is drawn from the tops of water tubes 14 by a thermal siphon which is created when the cool, more dense water in radiator/absorber 26 is heavier than the warmer water in water tubes 14. The warm water 49 exits the water tubes 14 through the warm water container header 24 and then enters warm water conduit 32. When the warm water 49 reaches the height of the high end of the radiator/absorber 26, it enters the warm water radiator/absorber header 52. The warm 4water radiator/absorber header 29 disperses the warm water 49 into the panels 27 of radiator/absorber 26. As the warm water travels from the high end of radiator/absorber 26 to the low end of radiator/absorber 26, it radiates heat into the atmosphere. Because there is little light and nothing above radiator/absorber 26, heat is not radiated back into water 49 and thus it travels reaches the low end of radiator/absorber 26 cooler than when it entered the high end of radiator/absorber 26. This cooled water is more dense and heavier than when it entered radiator/absorber 26.

When the now cooled and more dense water 49 reaches the low end of the panels 27 of radiator/absorber 26, it is gathered by the cold water radiator/absorber header 28. Cold water radiator/absorber header 28 feeds the cooled water 49 into the cold water conduit 34. The cooled water 49 enters cold water container header 34 which distributes the cooled water 49 to the lower sections of the water tubes 14. The cooled water 49 can now absorb the radiant heat traveling upward from the functional area of the enclosure 16. As the water 49 absorbs heat, it warms up and slowly travels to the top of the water tubes 14 as more cool water 49 is deposited in the bottom of the water tubes 14. When the warm water 49 reaches the top of the water tubes, the cycle caused by the thermal siphon continues. Because of the thermal siphon created naturally, the water 49 does not need to travel through pump 36 in order to circulate. Rather, the weight of the cooled water in radiator/absorber 26 causes it to flow downwardly into water tubes 14. The radiator/absorber is composed of parallel tubes and always sloped enough so that the tubes cause cool water to flow downwards. The greater the vertical distance from tank to radiator the greater the slope required. In addition, where there are cold winters the radiator may be sloped even more to catch winter sun, often as much as 45°. The warm, less dense water in water tubes 14 flows upwardly through warm water conduit 32. The water thus circulates continuously through radiator/absorber 26 so that the entire quantity of water is cooled, providing a cooling effect within the functional area 16 of enclosure 12. Moreover, the mass of water cooled at night provides a large thermal mass which will absorb heat during the ensuing day.

The winter configuration of the preferred embodiment of the present invention is illustrated in FIG. 5. When heating is desired during the winter, the level of the water 49 in apparatus 10 must be reduced. A drain valve 51 having a drain 50 is connected with the cold water conduit 34 at about the level of the tops of water tubes 16. Drain valve 51 is closed in summer to prevent loss of water 49 from the system. However, in winter, drain valve 51 is opened temporarily to allow the water to drain out of the system through drain pipe 50 until the water level is proximate the top of water tubes 16. Drain valve 51 is closed when the water has reached the desired level. When the system is at rest during the winter, radiator/absorber 26 will be empty and water tubes 16 will be slightly less than full of water 49. When all of the water 49 required by the preferred embodiment of the present invention for heating is settled, the water 49 only fills the water tubes 14. Draining sufficient water so that it is not located in radiator/absorber 26 and the connecting conduits has the added benefit of preventing the water from freezing.

In winter, when heating is most desired, the photovoltaic panel 38 gathers solar energy as the sun shines during the day. The energy gathered by the photovoltaic panel 38 is used to actuate pump 36. Cold water 49 is drawn from the bottom of water tubes 14 through the cold water container header 22 by pump 36. From the cold water header 22, cold water 49 enters cold water conduit 34. Pump 36 forces cold water 49 up through the cold water conduit 34 into the cold water radiator/absorber header 28 which is located at the lower end of radiator/absorber 26. Cold water 49 disperses through the second cold water header 28 and is forced into the plurality of panels 27 of radiator/absorber 26. As cold water 49 travels from the bottom to the high end of radiator/absorber 26, it is exposed to atmospheric conditions. Because the pump is only actuated during daytime, the water 49 traveling through radiator/absorber 26 is exposed to sunlight. The sunlight heats water 49 so that the water at the top of 26 is heated relative to the water entering at the bottom of the radiator/absorber.

When the heated water 49 reaches the top of radiator/absorber 26, it enters the warm water radiator/absorber header 52, which feeds the warmed water into the warm water conduit 32. As gravity pulls the warmed water 49 downward through warm water conduit 32, the warmed water flows into the first warm water header 24, which disperses the warmed water 49 into the top of the water tubes 14. The warmed water 49 radiates heat into the functional area 16 of the enclosure 12. As the water 49 radiates heat, it travels slowly to the bottom of the water tubes 14. As the water 49 has cooled and reaches the bottom of the water tubes 14, and new warmed water has flowed into the top of the water tubes 14, the cycle begins again.

Although it would also be optimal to be able to heat water 49 continuously when heating is desired, the heat from the sun is not available at all times. When a thermometer (not shown) senses a drop in temperature of the heated water below a specified point, the power from the photovoltaic panel 38 to pump 36 is discontinued and the pump shuts off.

With the pump 36 turned off at night, the water 49 will not circulate through apparatus 10 because the water level is limited to the tops of water tubes 14. The low level of water 49 in the apparatus 10 during the winter prevents the creation of a thermal siphon effect through radiator/absorber 26. This prevents the water 49 from losing heat at night by inadvertently passing through radiator/absorber 26.

The preferred embodiments of the present invention rely on the ability of the radiator/absorber 26 to expose water 49 to atmospheric conditions for maximum heating and cooling. In the winter, as illustrated in FIG. 5, the radiator/absorber 26 allows the water 49 to absorb as much heat as possible from the sun during the day. The warm water flows into water tubes 14 to heat the functional area 16 of enclosure 12. The amount of heat provided can be controlled using shutters 40. In the summer, as illustrated in FIG. 4, radiator/absorber 26 maximizes the amount of heat radiated by the radiator/absorber 26 at night to cool water 49. Water 49 absorbs heat during the day to cool the functional area 16 of enclosure 12, and dissipates that heat into the atmosphere at night.

Figure 6:
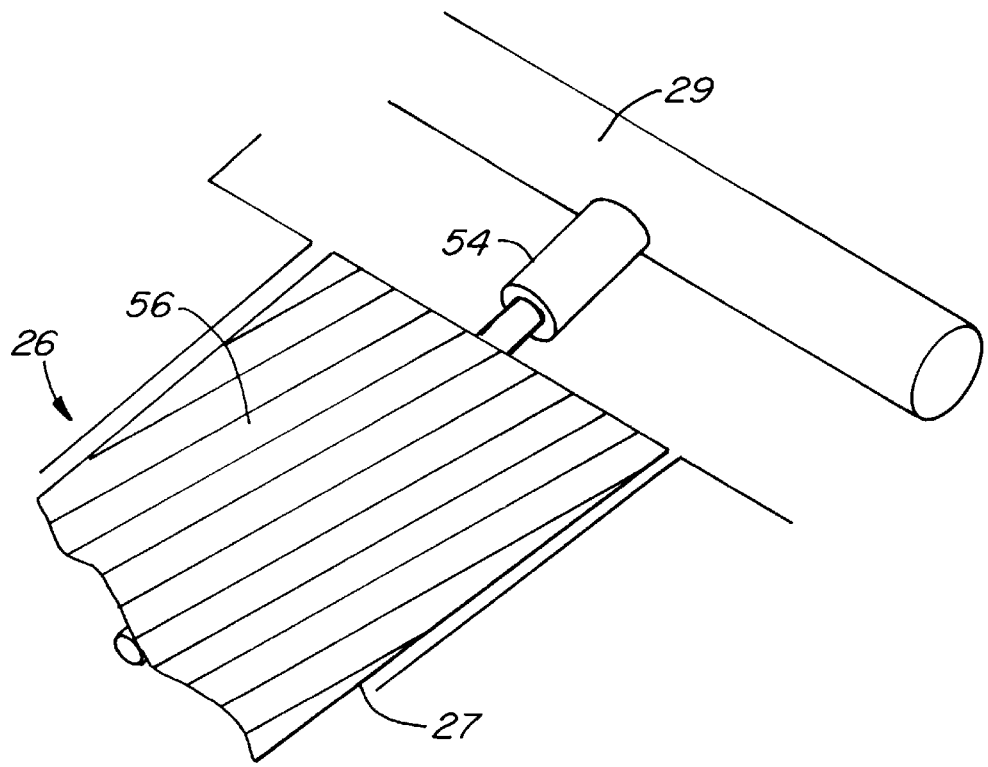
FIG. 6 is a fragmentary perspective view of the preferred embodiments of the water tube/header connection of the present invention.
Figure 7:
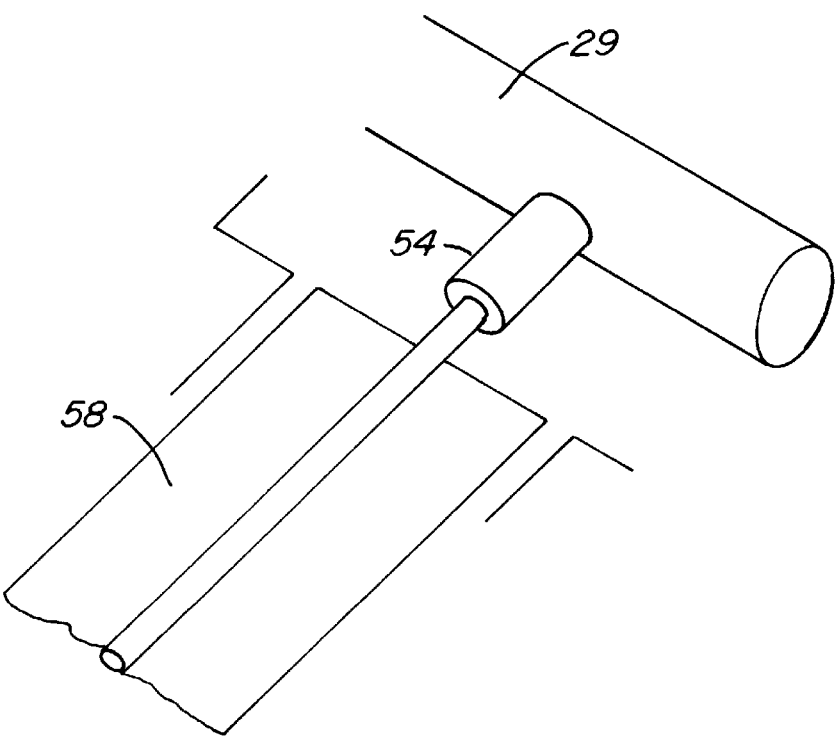
FIG. 7 is a fragmentary perspective view of an embodiment of the radiator/absorber/header connection of the present invention.

FIGS. 6 and 7 illustrates certain details of the preferred embodiments of the present invention which maximize the ability of the radiator/absorber 26 to passively provide heating and cooling of the water. The radiator/absorber panels 26 of the preferred embodiments can be rotated 180 degrees while maintaining operable connection to the headers 29,28 at the high and low ends of the panels 27 of radiator/absorber 26. The ends of each panel 27 of radiator/absorber 26 is connected to the cold water radiator/absorber header 28 and the warm water radiator/absorber header 29 by a plurality of short silicone rubber tubes 54. The ends of short tubes 54 which penetrate the header 29, 28 consists of a short silicone rubber insert fitting (not pictured). At low pressures, this short rubber insert fitting is self sealing. Because of the seal created by the short silicone rubber insert fittings, the panels 27 of the radiator/absorber 26 can be rotated without disrupting the operable contact made by the short tubes 54 to the headers.

In the winter, heat from the sun is absorbed to heat the water 49 in panels 27 of radiator/absorber 26 to deliver radiant heat to the functional area 16 of enclosure 12. In order to promote the absorption of heat by the water 49 while it is in radiator/absorber 26, one side of each of the radiator/absorber panels is covered in a black selective surface 56. Such a selective surface absorbs heat but does not reradiate it. This black selective surface 56 thus maximizes the amount of radiant solar heat the water 49 can absorb as it passes through radiator/absorber 26 without increasing the total size of radiator/absorber 26.

On the other hand, in the summer it is the goal of the radiator/absorber 26 to allow as much heat as possible to radiate out of the water 49. In order to maximize the amount of heat which can be radiated out from the water 49, the panels of the radiator/absorber 26 a rotated 180 degrees about their longitudinal axis. As a result of this rotation, the black selective surface 56 which was exposed in the winter is concealed, and the other side 58 of each of the panels 27 of radiator/absorber 26 is exposed. This other side of the radiator/absorber is preferably coated with a flat white paint 58. Flat white paint 58 reduces the amount of heat absorbed from the atmosphere while allowing as much heat as possible to radiate out from the water 49.

The preferred embodiments of the present invention thus provide for passive cooling in the summer and passive heating in the winter using the same plumbing and structural elements. The system is filled with water in the summertime, so that a thermal siphon effect will cause the water to circulate through the radiator/absorber 26, which acts as a radiator to dissipate heat into the atmosphere. The water level is reduced in winter to prevent the thermal siphon effect, and a pump 36, preferably solar powered, circulates water through the radiator/absorber 26, which acts as an absorber, to heat the water. The same water thus passively cools the enclosure in summer, and passively heats the enclosure in winter.

While preferred embodiments have been illustrated for purposes of example, it is to be expressly understood that modifications and adaptations of those embodiments will occur to those skilled in the art. All such modifications are within the spirit and scope of the present invention, as set forth in the following claims.

What is claimed is:

1. Apparatus for using water to control the internal temperature of an enclosure having a roof exposed to the atmosphere and an enclosed functional area, said apparatus comprising:

a container for water located within the enclosure and having opposite ends;

a generally flat hollow inclined radiator/absorber proximate and exterior to the enclosure having a higher end and a lower end, said radiator/absorber having a surface exposed to the atmosphere;

a pair of conduits including a warm water conduit between one end of the container and the higher end of the radiator/absorber and a cold water conduit between the other end of the container to proximate the lower end of the radiator/absorber; and a pump operatively connected with the cold water conduit, whereby the container, radiator/absorber, and conduits can be completely filled with water when cooling is desired so that the water will thermal siphon through the radiator/absorber to provide cooling at night, and whereby the container, radiator/absorber, and conduits can be partially filled with water when heating is desired and the pump actuated during periods of sunshine to provide solar heating.

2. The apparatus of claim 1 wherein the water includes anti-freeze or refrigerant to prevent overheating or freezing as the water is exposed to the atmospheric conditions in the radiator/absorber.

3. The apparatus of claim 1 wherein the container for water comprises a plurality of water tubes which are aligned parallel to each other.

4. The apparatus of claim 3 wherein the water tubes each comprise a thin wall PVC pipe.

5. The apparatus of claim 3 and additionally comprising a first set of two separate headers extending the lateral extent of the water container and located on opposite sides of the water container above the functional area of the enclosure, said set including a first cold water header connected to the cold water conduit and a first warm water header connected to the warm water conduit.

6. The apparatus of claim 5 wherein the plurality of water tubes are connected on each end to the header corresponding to that end of the water tubes by a small tube.

7. The apparatus of claim 5 wherein the header in contact with the cold water conduit is lower in height than the header in contact with the warm water conduit.

8. The apparatus of claim 7 wherein the plurality of water tubes connected to the first cold water header are connected to the water tubes near the bottom of the lateral ends of the water tubes, and wherein the plurality of water tubes connected to the first warm water header are connected to the water tubes near the top of the lateral ends of the plurality of water tubes.

9. The apparatus of claim 6 wherein the small tubes which connect the plurality of water tubes to the separate headers include short rubber insert fittings which at low pressure are self sealing and allow motion without leaking.

10. The apparatus of claim 1 and additionally comprising a second set of warm and cold water headers extending the length of the radiator/absorber, wherein the second warm water header is located above the radiator/absorber and the second cold water header is located below the radiator/absorber, and wherein the cold water conduit and warm water conduit are each in contact with the respective cold and warm water headers.

11. The apparatus of claim 10 wherein the plurality of radiator/absorber is connected at its upper and lower ends to the second set of headers by a plurality of small tubes.

12. The apparatus of claim 11 wherein the small tubes which connect the radiator/absorber to the two headers of the second set contain short rubber insert fittings which at low pressure are self sealing and allow motion without leaking.

13. The apparatus of claim 1 wherein the radiator/absorber is composed of a plurality of panels which can be rotated at least 180 degrees.

14. The apparatus of claim 13 wherein one side of each of the panels is covered in flat white paint to reflect any incident light.

15. The apparatus of claim 14 wherein the other side of each of the panels is covered by a black selective surface to facilitate the absorption of solar energy.

16. The apparatus of claim 1 wherein the radiator/absorber comprises a hollow sheet of flexible material having a multiple aligned interior flow paths extending between the higher and lower ends of the radiator/absorber.

17. The apparatus of claim 16 wherein the flexible material is polypropylene.

18. The apparatus of claim 1 further comprising an expansion tank connected to the upper end of the radiator/absorber to allow for proper adjustments of the water level within the water container, radiator/absorber, and conduits.

19. The apparatus of claim 1 further comprising a plurality of operable shutters located between the water container and the functional area of the enclosure to selectively block excess radiant heat from the water container when more heat has been stored then is immediately required.

20. The apparatus of claim 19 wherein the shutters are constructed of rotatable unpainted aluminum panels.

21. The apparatus of claim 1 further comprising a photovoltaic panel connected and providing power when desired to the pump.

22. The apparatus of claim 1 wherein the enclosure is designed for human habitation.

23. The apparatus of claim 1 wherein the enclosure is designed for occupation by animals and/or equipment.

24. A method for using different quantities of water to control the internal temperature of an enclosure having a roof exposed to the atmosphere and having an enclosed functional area, said method comprising:

securing a water container having opposite ends above the functional area of the enclosure;

installing a generally flat hollow radiator/absorber in an inclined configuration with a higher end and a lower end proximate and exterior to the enclosure, said radiator/absorber having an exposed surface adapted to radiate heat into the atmosphere and absorb heat from the sun;

connecting one end of the water container to the high end of the radiator/absorber with a warm water conduit and connecting the opposite end the water container to the low end of the radiator/absorber with a cold water conduit;

filling the water container, radiator/absorber, and conduits completely with water when cooling is desired so that the water will thermal siphon through the radiator/absorber to provide cooling at night;

operatively connecting a pump with the cold water conduit; and filling the water container, radiator/absorber, and conduits partially with water when heating is desired and actuating the pump during periods of sunshine to provide solar heating.

25. The method of claim 24 and further comprising the step of adding anti-freeze or refrigerant to the water to prevent overheating or overcooling of the water as it is exposed to the atmospheric conditions in the radiator/absorber.

26. The method of claim 24 and additionally comprising the step of extending the cold water conduit and the warm water conduit into operable contact with respective cold water and warm water container headers each extending the lateral extent of the water container and located on opposite sides of the water container above the functional area of the enclosure.

27. The method of claim 26 and further including the step of connecting the ends of the water container to the respective container headers.

28. The method step of claim 27 and additionally comprising the step of operationally connecting the cold water container header with the bottom of the end of the water container, and operationally connecting the warm water container header with the top of the end of the water container.

29. The method of claim 26 and further comprising the step of mounting the cold water container header so that it is lower in height than the warm water container header.

30. The method of claim 24 further comprising the step of coating one side of the with flat white paint to promote the radiation of heat into the atmosphere, and covering the other side of the radiator/absorber with a black selective surface to increase the heat absorbed by the panels from the sun, and rotating the radiator/absorber so that the flat white paint side is exposed to the atmosphere during the summer, and the black selective surface side is exposed to the atmosphere during winter.

31. The method of claim 24 further comprising the step of installing an expansion tank connected by a third conduit to the upper end of the radiator/absorber to maintain the water level within the water container, radiator/absorber, and conduits above the level of the radiator.

32. The method of claim 24 further comprising the step of installing a plurality of operable shutters between the water container and the functional area of the enclosure to block excess radiant heat from the water container when more heat has been stored than is immediately required.

33. Apparatus using different quantities of water to control the internal temperature of an enclosure having a roof exposed to the atmosphere and an enclosed functional area with an overhead ceiling, said apparatus comprising:
- a plurality of water tubes aligned parallel to each other and having opposite lateral ends located above the functional area of the enclosure;
- a generally flat hollow inclined radiator/absorber proximate and exterior to the enclosure composed of a plurality of panels with a higher end and a lower end;
- a pair of conduits including a warm water conduit and a cold water conduit each having a header on both ends, said warm water conduit having one header proximate the higher lateral ends of the water tubes and having the other header proximate the higher end of the radiator/absorber, said cold water conduit having one header proximate the lower and opposite lateral ends of the water tubes and having the other header proximate the lower end of the radiator/absorber;
- a pump operatively connected with the cold water conduit;
- a plurality of operable shutters located between the water tubes and the functional area of the enclosure to selectively block excess radiant heat from the water tubes when more heat has been stored than needs to be used immediately; and
- an adjustable amount of water contained within the water tubes, headers, conduits, and radiator/absorber and flowing either by thermosiphon or actuation of the pump through the water tubes, headers, conduits, and radiator/absorber.

34. The apparatus of claim 33 wherein the radiator/absorber panels are rotatable to expose opposite sides, and wherein said panels are coated with flat white paint on one side and have a selective black surface on the other side.

35. The apparatus of claim 33 wherein the water includes anti-freeze or refrigerant to prevent overheating or overcooling as the water is exposed to atmospheric conditions in the radiator/absorber.

36. The apparatus of claim 33 wherein the plurality of water tubes are connected on each end to the header corresponding to that end of the water tubes of the water tubes by small tubes.

37. The apparatus of claim 36 wherein the small tubes which connect the plurality of water tubes to the separate headers contain short rubber insert fittings which at low pressure are self sealing and allow motion without leaking.

38. The apparatus of claim 36 wherein the plurality of radiator/absorber panels are connected on their upper and lower ends to the proximate header by small tubes.

39. The apparatus of claim 38 wherein the small tubes which connect the radiator/absorber panels and the proximate headers contain short rubber insert fittings which at low pressure are self sealing and allow motion without leaking.

40. The apparatus of claim 33 further comprising an expansion tank connected by a third conduit to the upper end of the radiator/absorber.

41. Apparatus using different quantities of water to control the internal temperature of an enclosure having a roof to expose to the atmosphere and an enclosed functional area, said apparatus comprising:
- a plurality of water tubes aligned parallel to each other and having opposite lateral ends located above the functional area of the enclosure;
- a flexible sheet proximate an exterior to the enclosure mounted in an inclined configuration with a higher end and a lower end and having a plurality of interior flow paths extending from the higher end to the lower end of the sheet;
- a pair of conduits including a warm water conduit between one end of the water tubes and the higher end of the flexible sheet and a cold water conduit between the other end of the water tubes and the lower end of the flexible sheet;
- a pump operably connected with the cold water conduit; and
- a quantity of water filling the water tubes, conduits and the channels within the flexible sheet when cooling is desired so that the water will thermal siphon through the flexible sheet to provide cooling at night, and whereby the container, conduits and flexible sheet are partially filled with water when heating is desired and the pump actuated during period of sunshine to provide solar heating.

42. The apparatus of claim 41 wherein the flexible sheet is constructed from polypropylene.

43. A method using different quantities of water for controlling the internal temperature of an enclosure having a roof exposed to the atmosphere and having an enclosed functional area, said method comprising;
- exposing the water contained within an upward facing radiator/absorber located on the roof of the enclosure to atmospheric conditions which will cool the water on summer nights and heat the water on winter days;
- allowing the water to return to the water tubes which are located above the functional area of the enclosure and below the ceiling of the enclosure so the heated or cooled water can radiate heat or cool into the functional area of the enclosure;
- filling the water tubes, radiator/absorber, and conduits completely with water when cooling is desired;
- cooling the water which is used to cool the functional area within the enclosure by allowing the water to thermosiphon through the radiator/absorber at night to release the heat absorbed by the water during the day;
- filling the water tubes, radiator/absorber, and conduits partially with water when heating is desired to prevent thermal siphoning which would lead to cooling; and
- heating the water used to heat the functional area of the enclosure by pumping the water through the radiator/absorber during the day and allowing the water to absorb heat from the sun.

44. A method for controlling the internal temperature of an enclosure having a roof exposed to the atmosphere and having an enclosed functional area with an overhead ceiling utilizing different quantities of water, said method comprising;
- exposing the water contained within an upward facing radiator/absorber located on the roof of the enclosure to atmospheric conditions which will cool the water on summer nights and heat the water on winter days;

allowing the water to return to the water tubes which are located above the functional area of the enclosure and below the ceiling of the enclosure so the heated or cooled water can radiate heat or cool into the functional area of the enclosure;

filling the water tubes, radiator/absorber, and conduits completely with water when cooling is desired;

cooling the water which is used to cool the functional area of the enclosure by allowing the water the thermosiphon through the radiator/absorber at night to release the heat absorbed by the water during the day;

filling the water tubes, radiator/absorber, and conduits partially with water when heating is desired to prevent thermosiphoning which could lead to cooling;

heating the water used to heat the functional area of the enclosure by pumping the water through the radiator/absorber during the day and allowing the water to absorb heat from the sun; and controlling the amount of heat radiated by the water tubes into the functional area of the enclosure by opening and closing a plurality of operable shutters located between the functional area of the enclosure and the water tubes.

* * * * *